April 10, 1934. W. A. WEIGHTMAN 1,954,760
SPREADER FOR OPPOSED SPIDER WELDING MACHINES
Filed June 17, 1932 4 Sheets-Sheet 1
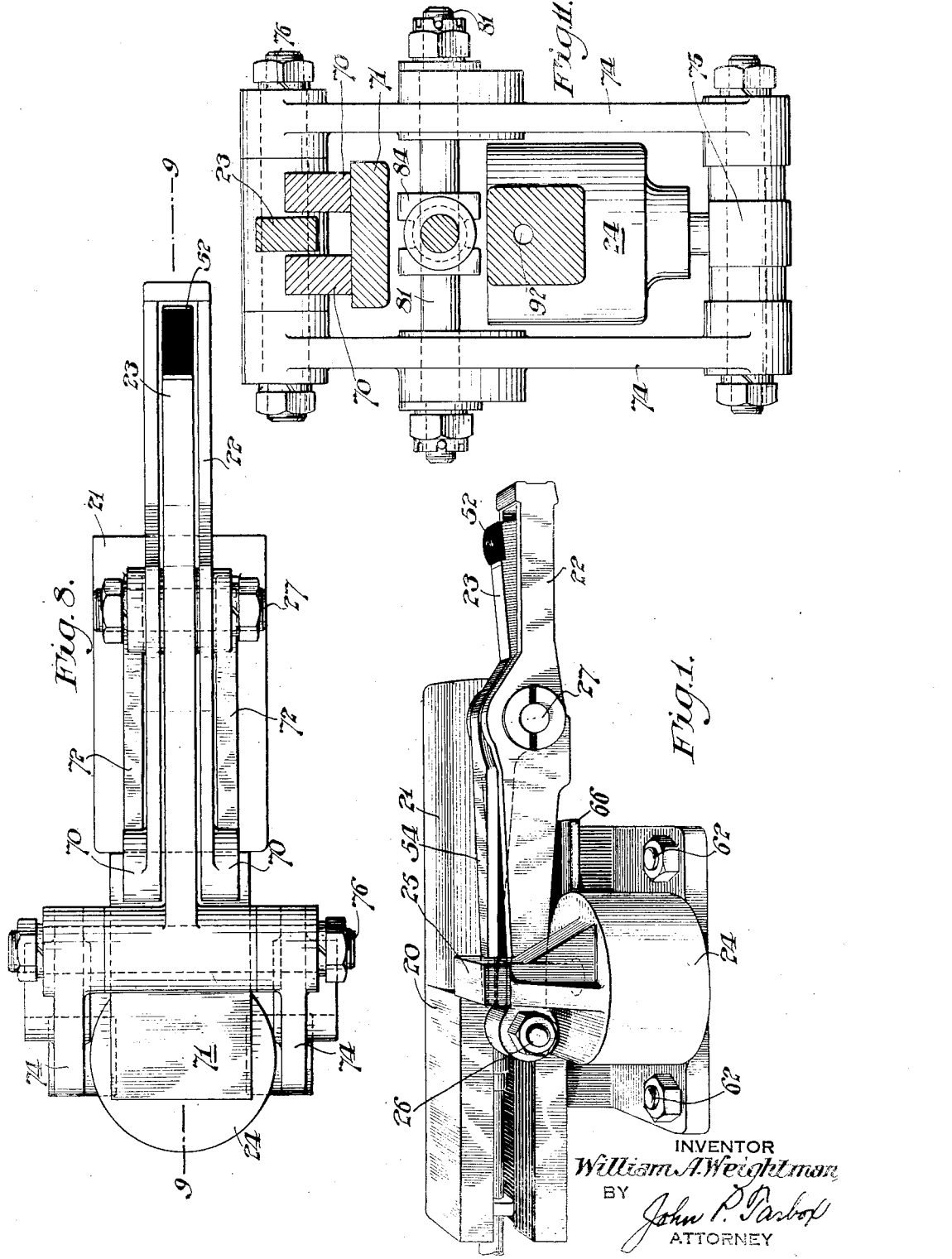

April 10, 1934. W. A. WEIGHTMAN 1,954,760
SPREADER FOR OPPOSED SPIDER WELDING MACHINES
Filed June 17, 1932 4 Sheets-Sheet 2
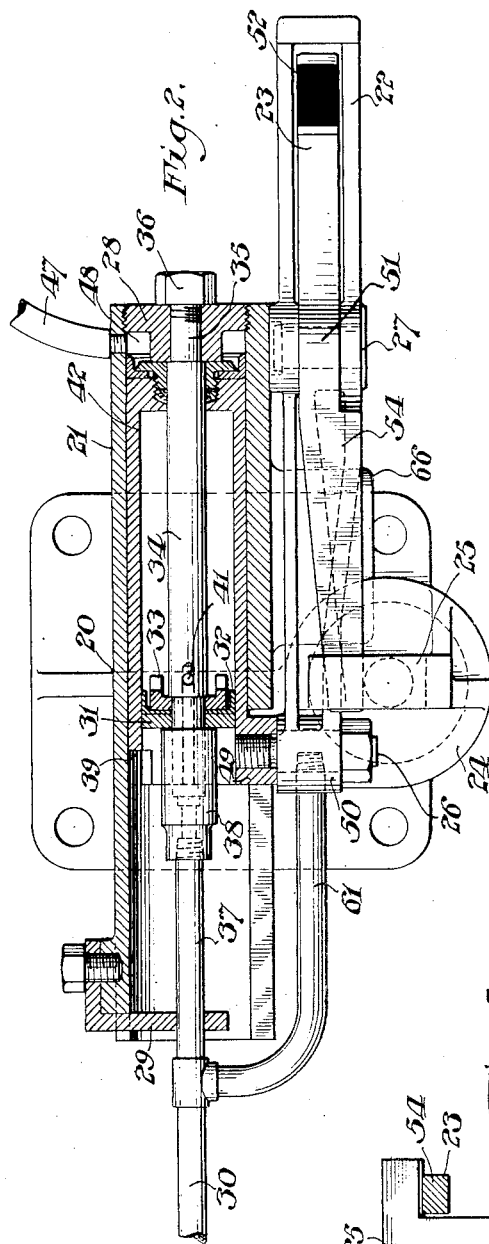
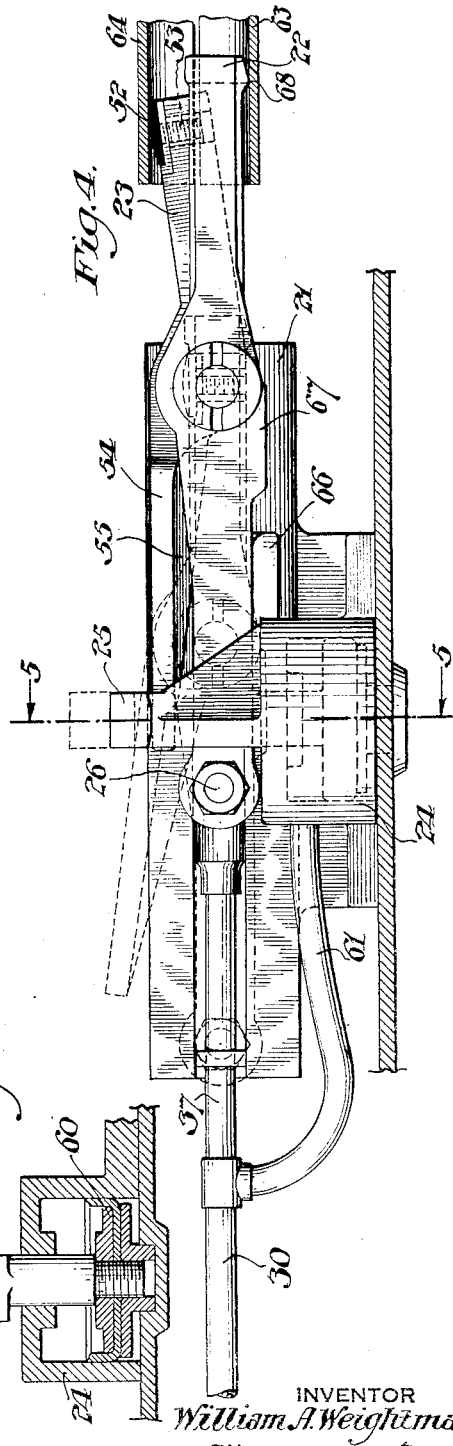
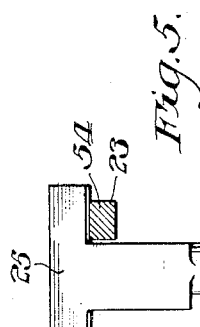
INVENTOR
William A. Weightman,
BY
John P. Barbor
ATTORNEY April 10, 1934.  W. A. WEIGHTMAN  1,954,
SPREADER FOR OPPOSED SPIDER WELDING MACHINES
Filed June 17, 1932  4 Sheets-Sheet
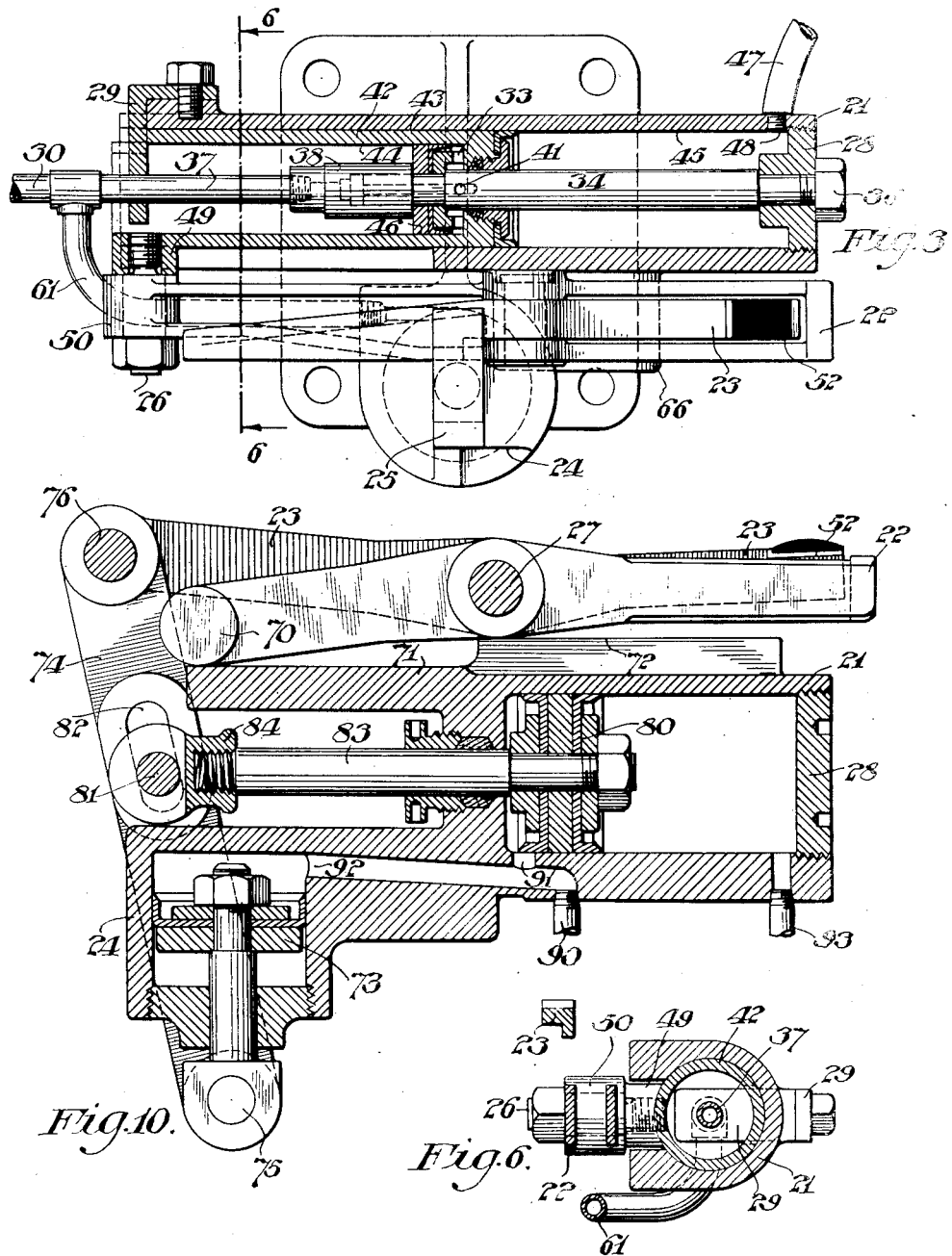
INVENTOR
William A. Weightman,
BY
John P. Taylor
ATTORNEY April 10, 1934.  W. A. WEIGHTMAN  1,954,760
SPREADER FOR OPPOSED SPIDER WELDING MACHINES
Filed June 17, 1932  4 Sheets-Sheet 4
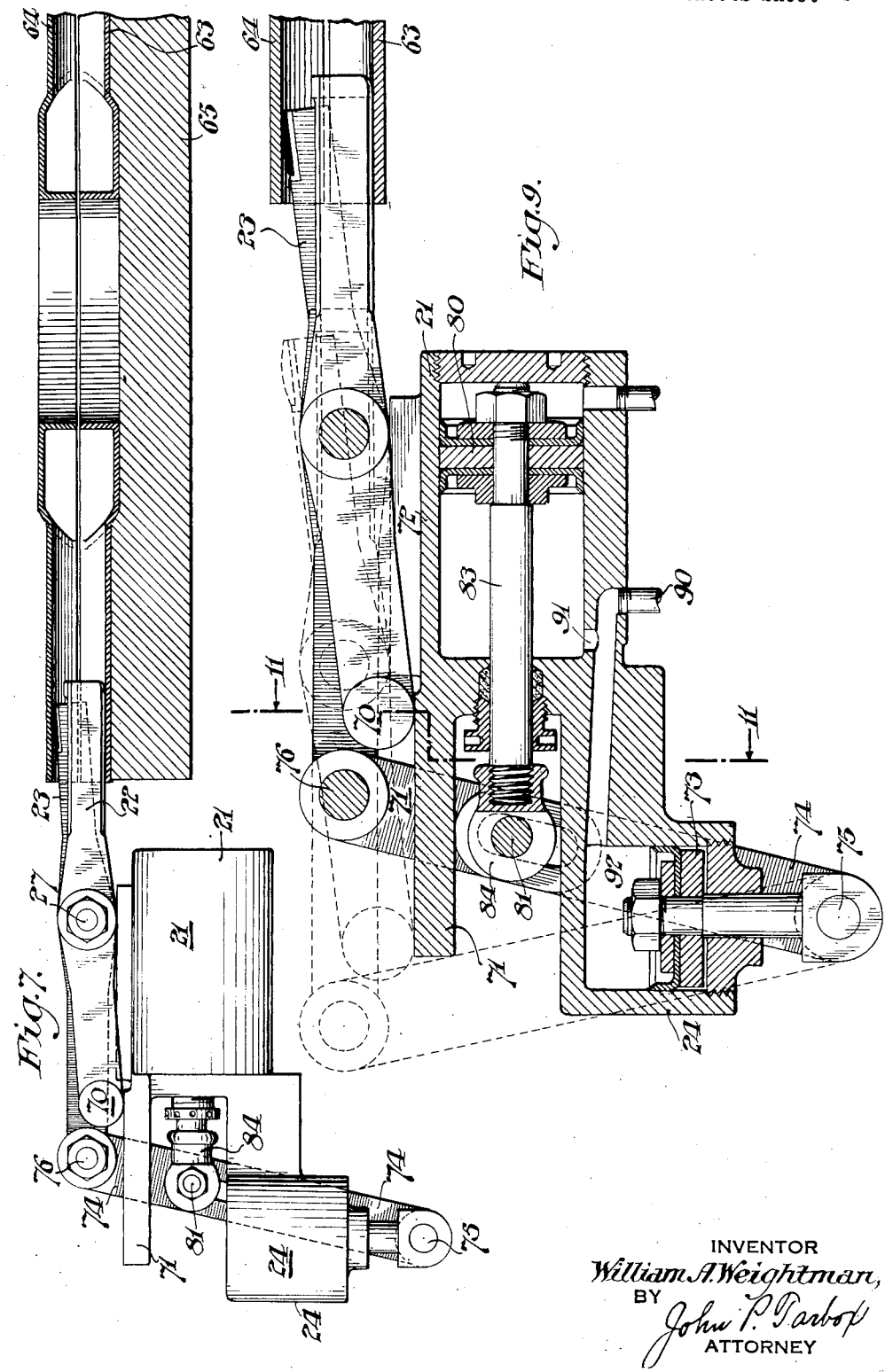
INVENTOR
William A. Weightman,
BY
John P. Tarbox
ATTORNEY Patented Apr. 10, 1934

1,954,760

UNITED STATES PATENT OFFICE 1,954,760

SPREADER FOR OPPOSED SPIDER WELDING MACHINES

William A. Weightman, Detroit, Mich., assignor to Budd Wheel Company, Philadelphia, Pa., a corporation of Pennsylvania Application June 17, 1932, Serial No. 617,720

15 Claims. (Cl. 219—4)

My invention relates to welding and more particularly to apparatus adapted for use in the welding of complementary type spider members. In flash welding of complementary spider members it is readily apparent that means must be interposed between the two members, in the nature of separators or spreaders, so that during the approach of the welding dies or electrodes, the gap between the parts to be united will be closed slowly and a homogeneous joint along the medial plane of the two members will be attained. It is extremely difficult to construct welding dies or electrodes which are adapted for relative approach motion with respect to each other while having incorporated for co-operation therewith a mechanism of one sort or another capable of holding the work piece against the matrix of the die during this relative approach motion. Many devices and schemes have been developed to overcome the obstacles encountered and although many are relatively satisfactory, they fall short of the ultimate result desired. Inasmuch as the size of a spoke section is very small, apparatus of very small size only can be satisfactory.

It is the object of my invention to surmount the previously enumerated obstacles and others not herein expressly enumerated but incidental to those mentioned by constructing an apparatus capable of performing the above functions.

I attain these objects by constructing an apparatus comprising arms pivotally secured together and adapted for insertion and retraction from between the complementary spoke portions of a spider member and having automatically controlled pneumatic motors arranged to initiate said motions and inter-linkages for the purpose of co-ordinating or synchronizing the respective actions of the individual component parts.

My invention consists essentially of welding supporters comprising pivoted arms arranged for scissorlike motion, a pneumatic motor to progress and retract the arms, a pneumatic motor adapted to actuate the scissorlike motion and means interlinking said motors and said arms to co-ordinate their action.

My invention will be better understood from the following description when considered in connection with the accompanying drawings, and its scope will be pointed out in the appended claims.

In the accompanying drawings, wherein like ordinals represent corresponding parts in the various figures, Figure 1 is a perspective of apparatus constructed in accordance with my invention, Fig. 2 is a plan partly in section, with the arms in advanced separated position, Fig. 3 is a plan partly in section, showing the parts in inactive position with the arms retracted and closed, Fig. 4 is an elevation showing the arms in co-operating relation with respect to the work-pieces, Fig. 5 is a section on the line 5—5 of Fig. 4, Fig. 6 is a section on the line 6—6 of Fig. 3 showing the sleeve-type piston, Fig. 7 is an elevation of a slightly different form of my device showing the work parts and lower welding die in assembled position, Fig. 8 is a plan view of the device in advanced extended position, Fig. 9 is a cross section elevation with the parts in extended position substantially along the line 9—9 of Fig. 8, Fig. 10 is a similar view showing the parts in inactive or retracted position, and Fig. 11 is a section on the line 11—11 of Fig. 9.

Referring to the figures in more detail, Figs. 1 to 6, inclusive, primarily relate to one form of construction and Figs. 7 to 11, inclusive, comprehend a slightly modified form. It is readily apparent, however, that the basic principles of these two devices are the same and that the distinguishing feature is that the lost motion connection between the arms and the motors is interposed in a slightly different form.

In Fig. 1 the device is shown as comprising essentially a housing 20 having a fluid actuated motor in the substantially cylindrical portion 21 adapted for reciprocating motion, for the purpose of advancing and retracting the arms 22 and 23 into and out of the work. Mounted on this same housing is another fluid actuated motor 24 which is adapted for reciprocating motion and co-operates by means of a connecting rod 25 of T-head shape with the arm 23 in the extended position. The scissorlike motion imparted to the arms is accomplished about the pivot 27. The piston operating in the cylinder 21 is of the sleeve type 42 having an extension to which is pivotally secured at the point 26 the arm 22.

The cylinder 21 is closed at the right-hand end by a suitable screw-threaded head 28. At the opposite end of the cylinder is placed a bracket member 29 serving a dual purpose of retaining the pipe line 30 centrally of the apparatus and also as a co-operating limit stop in conjunction with the shoulder 39 upon the sleeve-type piston 42. The pipe line 30 continues from the bracket 29 into the left-hand head of the cylinder 31.

This cylinder head comprises a metallic member 31, a packing of suitable type 32 and a second metallic member 33 which serves as a limit stop for the piston and also as a means for holding the packing in fixed association with its co-operating parts. This head of the cylinder is positioned interiorly of the sleeve piston and serves to close the cylinder at this end. It is maintained in central position by means of its interior co-operation with the piston, as well as by the rigid bracing, as far as axial motion is concerned, by means of the shaft 34, which is fastened to the cylinder head 28 at one end by a reduced section 35 threaded and to which is secured the nut 26. The rigid axis of the device substantially comprises a portion of the air-line 37, the fitting 38 and the rod 34, between the bracket connection 29 and the cylinder head 28. The fitting 38 has a suitable opening therein for co-operation with the opening in the pipe 37 and the passage 30 interiorly of the rod 34 which co-operates with the port 41.

The operation of this much of the apparatus is readily apparent from Fig. 3 wherein the parts are shown in their retracted position. The sleeve piston 42 clears the port 41 when in retracted position by means of the castellated member 33. The air control is exteriorly of the point 30 by means of suitable automatic valves adapted to co-ordinate a plurality of these spreaders, spaced circumferentially of the welding machine commensurately with the number of spokes of the spider being formed. Upon the pressure building up in the cylinder from the pipe line 30 by means of the port 41, the piston 42 is caused to move to the right carrying with it the arms 22 and 23. The two concentric cylindrical walls 43 and 44 of the piston co-operate respectively with the internal wall 45 of the cylinder 21 and the outer periphery 46 of the cylinder head 31. This action places the device in the position of Fig. 2. After the welding operation has been completed and it is desired to again retract the arms, air or other fluid is admitted to the cylinder by the pipe-line 47 and port 48. The piston is then moved to the position shown in Fig. 3.

At the left-hand end of the sleeve piston 42 is a boss 49 having a threaded opening for the reception of a stud 26, which stud passes interiorly of the co-operating part 50 at the left-hand extremity of the arm 22. By this pivotal connection reciprocating action of the piston is transmitted to the two co-operating arms 22 and 23, as is readily apparent. The arm 23 has a boss portion 51 substantially centrally thereof said boss portion being adapted for the reception of a suitable pin or other member 27 and has upon the upper surface of its right-hand extremity an insulating button 52 secured by some such expedient as the screw-threaded member 53. The purpose of this insulating member is to break the conducting path between the two spider members through this interposed insulating portion. The left-hand portion of the arm is of substantially wedge-shape 54 above and having a reinforcing web or flange 55. The upper portion of this arm is adapted for co-operation with one of the extending portions of the T 25.

Interiorly of the cylinder 24 as seen in Fig. 5, the T-headed piston rod 25 has at its inner extremity a piston 60 of suitable form. The air inlet for this cylinder is by means of extension 61 of the pipe 30. The exhausting of cylinder 24 and cylinder 21 may be readily attained through the pipe 30 by a three-way valve connecting the supply, exhaust, and the line 30. An air supply upon the opposite side of this motor 24 is unnecessary inasmuch as the arms are properly proportioned as to balance and weight so that the T-head connecting rod of the piston moves upwardly due to the mere release of pressure upon the upper side of the piston. In this manner one set of co-operating piping may be eliminated. However, if it should be desirable because of other reasons the parts may be adapted for this control irrespective of the balancing of the arms.

The housing 20 is secured to the welding machine by bolts 62 and mounted in spaced relation to the lower die or electrode. The lower workpiece 63 is placed upon the lower die 65 after which the air-line 30 is open to pressure whereby the sleeve piston moves from left to right thrusting the arms into the radially extending spoke portions of the spider member. As the arms move forward from a position of rest upon the shelf 66 they drop downwardly due to the disengagement of the portion 67 of the arm 22 from the shelf. This allows the arm to rest freely upon the lower spider at point 68. The spacing of the outer extremity of the arm from the work piece when in retracted position should be such as to be commensurate with the duration of travel of the abutment 67 upon the shelf or bearing seat 66 so that at the time the abutment approaches the outer extremity of the shelf, the outward portion of the arm 22 will be substantially within the peripheral extremity of the spider member 63. In this manner it is unnecessary to have a bearing upon which the arms may rest, inasmuch as, in actuated position a two-point suspension is attained by the point of rest 68 and pivoting point 26. In retracted position a two point position is again attained by the pivoting point 26 and the shelf member 66.

At the same time the arms are moving forward, due to the energization of the motor 21, the motor 24 is likewise being energized. This may be done simultaneously with the motor 21 or it may be retarded somewhat by proportioning the admission port accordingly. The T-head 25, as a result of the piston being in its lowered position, contacts with the extended portion 54 of arm 23 while the arms are advancing into the work part thereby actuating the scissorlike motion and separating the outer extremities of the two arms. After this operation has been completed the upper work member 64 is placed upon the arm 23 in insulated relation thereto by means of the abutments 52. The relative approach motion of the welding dies is then initiated and the welding completed during which time the extended arms may yield due to the approach motion of the parts. After this welding operation is completed the air-line 30 is exhausted thus removing pressure from the two cylinders. The port 48 is supplied by pressure from a suitable fluid medium, such as oil or a gas, thus snapping the sleeve piston to the left and retracting the arms from the work. This manner of operation continues at each actuation of the device.

The weight of the arms is such that upon the withdrawal of pressure the T-head is raised into the dotted position of Fig. 4, thereby allowing the two arms to return to closed position. The lost motion connection between the arms 22 and 23 in this form occurs due to the non-positive connection between the T-head 25 and the arm 23. The slightly modified construction incorporating this previously described principle of operation is shown in the remaining figures of the drawings.

In the modified form shown in Fig. 7 the cylinders 21 and 24 have the axes at right angles to each other intersecting outside thereof upon a substantial projection of the individual connecting rod axes. This is not absolutely necessary, however, inasmuch as the parts may be laterally disposed commensurately with good design. In this form the sleeve valve type of piston is eliminated for the customary form of valve and a connecting rod using a slot and pin connection is used.

The apparatus is in retracted position in Fig. 10 prior to loading the welding machine, whereas in Fig. 9 the apparatus has been actuated. The piston 80 again functions in the same manner as previously described having a reciprocating motion and advancing and retracting the arms 22 and 23 similarly. In this instance, the arm 23 is pivoted to the arm 22 by a connection similar to that of the previously described apparatus but the arm 22 in this instance has a plurality of bosses 70 to rest upon the portion 71 of the housing in retracted position and upon the portion 72 in advanced position. The arms move forward due to the actuation of motor 21. Arm 22 pivots about the point 27 as the portion 70 rests in its initial position and receives part of its scissor motion due to the portion 70 riding upon the surface 72. The remainder of the scissor-like motion is imparted due to the actuation of the piston 73 downwardly in the cylinder 24. This downward motion of the piston is transmitted to the arm 23 by means of the link 74 interconnecting the arm and piston pivotally to the two point connection 75 and 76. The piston 80 operating in cylinder 21 is fastened to the arm 74 by means of a lost motion connection comprising a pin 81 and a slot 82, the pin passing through a yoke member 84 which is carried upon the piston rod 83. It is readily apparent that the admission of fluid through the port 90, corresponds to the connection 30 of the other figure, and then goes into the cylinders 21 and 24 respectively through passages 91 and 92. This causes the piston 73 to snap downwardly and the piston 80 to snap to the right inserting the arms or separators between the work parts and at the same time actuating the scissor motion to spread the arms in the extended position. After the welding operation has been completed the port 90 is open to exhaust at which time the port 93 is opened and the piston 80 snapped to the left withdrawing the separators from the work piece. At the same time the proper balance of the parts accomplishes the upward motion of the piston 73.

The essential details of this modified form having been described and the operation being substantially as previously enumerated in the more detailed description of the device of Figs. 1 to 6, I aim to cover in the appended claims all modifications within the true spirit and scope of my invention.

The embodiment of the invention illustrated and described herein has been selected for the purpose of clearly setting forth the principles involved. It is apparent that the invention is susceptible of being modified to meet different conditions encountered in its use and I therefore aim to cover by the appended claims all modifications within the true spirit and scope of the invention.

What I claim is:

1. A device for spacing and clamping complementary spider shaped stampings against the dies of a welding machine comprising radially insertable members arranged to enter the ends of the superposed duplicate spiders, means arranged to control said insertion, means arranged to separate said members in inserted position, and means interlinking said means and co-ordinating their actuation.

2. Welding separators comprising, pivoted arms arranged for scissorlike motion, a pneumatic motor to progress and retract said arms, a pneumatic motor arranged to actuate said scissor action, and means interlinking said motors and arranged to coordinate said parts.

3. Work separators for complementary spider shaped members comprising pivoted arms arranged for scissorlike motion, a fluid motor arranged to advance and retract said arms, a fluid motor arranged to separate said arms, means interconnecting said motors and arranged to co-ordinately actuate the same, and lost motion means interposed between said arms and said arm separating motor.

4. A welding apparatus for forming spider shaped members with hollow radial portions from complementary spider members having segmental radial portions which comprises opposed relatively movable welding dies, and a plurality of simultaneously actuated separators arranged for interposition between the spoke portions of said spider members comprising arms having scissorlike action, motor means to actuate said arms, motor means to advance and retract said arms and means interconnecting said motor means and said arms.

5. A work piece separator for complementary spider members comprising a sleeve type fluid actuated piston, separable arms pivotally secured to said piston and arranged for scissorlike motion about a point removed from said pivoted connection, means to reciprocate said arms, and means including a lost motion connection arranged to actuate the scissor-like motion of said arms in advanced position.

6. A work piece separator for welding machines comprising arms arranged for scissor-like motion about a common point, means including a piston arranged to reciprocate in a plane at right angles to the reciprocating axis of motion of said arms, a linkage interposed between said parts and pivotally secured to said arms at a point remote from said common point, and means including a fluid actuated piston to advance and retract said arms into and between the work pieces.

7. In combination a housing, a plurality of reciprocable cylinders having pistons operating upon axes intersecting externally of said cylinders, a pair of pivotally connected arms arranged to move upon the top of said housing in a direction substantially parallel to the axis of one of said cylinders, and means interconnecting said pistons to said arms at a point remote from the pivot and arranged to advance and retract said arms and to separate them in advanced position.

8. A device for spacing and clamping complementary spider-shaped stampings against the dies of a welding machine comprising radially insertable members arranged to enter the ends of the superposed duplicate spider stampings, fluid operated means arranged to control said insertion, fluid operated means arranged to separate said members in advanced inserted position, and means interlinking said afore-mentioned means whereby to controllably coordinate their actuation.

9. A device for spacing and clamping sheet metal stampings having juxtaposed complementary edge portions against the dies of a welding machine comprising insertable members arranged to enter openings in the superposed stampings and lie interiorly thereof, means arranged to control said insertion, means arranged to effectively separate said members in inserted position, and means interlinking said afore-mentioned means and coordinating their actuation.

10. Welding separators comprising pivoted arms arranged for substantially scissor-like motion, motor means to progress and retract said arms, motor means arranged to effect the actuation of said scissor-like motion, and means interlinking said motor means and arranged to coordinate said parts.

11. Welding separators comprising pivoted arms arranged for substantially scissor-like motion, motor means to progress and retract said arms simultaneously, motor means arranged to effect the actuation of said scissor-like motion, and means interlinking said motor means and arranged to coordinate the actions or motions of said parts.

12. Work separators for members having complementary juxtaposed edge portions comprising pivoted arms arranged for substantially scissor-like motions, motor means arranged to advance and retract said arms, motor means arranged to separate said arms, means interconnecting said motor means and arranged to coordinately actuate the same, and lost motion means interposed between said arms and said arm separating motor means.

13. In combination, a housing, a plurality of reciprocable motor means operating upon intersecting axes, a pair of arms arranged to have substantially scissor-like motion about a common axis and to have relative reciprocable motion with respect to said housing, and means interconnecting said motor means and said arms at a point remote from the common axis of said arms and arranged to advance and re-tract said arms and to effect the separation of said substantially scissor-like motion in the substantially advanced position of said arms.

14. A device for spacing and clamping sheet metal stampings having juxtaposed complementary surface portions against the dies of a welding machine comprising a housing, a cylindrical piston arranged to reciprocate within said housing, said housing providing a circumscribing cylinder for said piston, means positioned concentric with the axis of said piston and arranged interiorly thereof to provide the relatively fixed wall of a cylinder, the interior cylindrical walls of said piston comprising the movable side walls and piston thereof, arms arranged for substantially scissor-like action with respect to each other about a common axis and for substantially reciprocating action with respect to said housing, means effectively connecting said cylindrical piston and said arms to effect the reciprocating action thereof, means whereby said arms being arranged to move into said complemental parts on one plane and to move into a different plane of contact with said stampings after reaching the interior thereof, and means arranged to effect the scissor-like action of said arms and to retain said arms in actuated position while maintaining a yielding actuating pressure thereupon.

15. A device for spacing and clamping stampings having complementary juxtaposed portions against the dies of the welding machine comprising means arranged for movement into and between said complemental stampings, means whereby said last-named means move into said stampings on one plane and in their extreme advanced position move into a second plane, means arranged to effect a relative action of said first-named means, whereby to space said stampings and retain said stampings in spaced yielding position, and means interconnecting said last-named means and said first-named means and coordinating the action thereof.

WILLIAM A. WEIGHTMAN.